United States Patent
Inokuchi et al.

(10) Patent No.: US 10,414,883 B2
(45) Date of Patent: Sep. 17, 2019

(54) METHOD FOR PRODUCING MOLDED ARTICLE, MOLDED ARTICLE, BACK PLATE AND BRAKE PAD

(71) Applicant: SUMITOMO BAKELITE CO., LTD., Tokyo (JP)

(72) Inventors: Hideaki Inokuchi, Tokyo (JP); Shinya Yamamoto, Tokyo (JP); Koji Koizumi, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 15/114,321

(22) PCT Filed: Jan. 22, 2015

(86) PCT No.: PCT/JP2015/051728
§ 371 (c)(1),
(2) Date: Jul. 26, 2016

(87) PCT Pub. No.: WO2015/115306
PCT Pub. Date: Aug. 6, 2015

(65) Prior Publication Data
US 2017/0009031 A1    Jan. 12, 2017

(30) Foreign Application Priority Data

Jan. 29, 2014 (JP) ................................ 2014-014882
Jan. 29, 2014 (JP) ................................ 2014-014883

(51) Int. Cl.
*B29B 9/06* (2006.01)
*C08J 5/04* (2006.01)
(Continued)

(52) U.S. Cl.
CPC ............... *C08J 5/043* (2013.01); *B29B 9/06* (2013.01); *B29B 9/14* (2013.01); *B29B 9/16* (2013.01);
(Continued)

(58) Field of Classification Search
CPC ........... B29B 9/14; B29B 15/122; B29B 9/06; B29B 15/125
See application file for complete search history.

(56) References Cited

U.S. PATENT DOCUMENTS 4,086,985 A * 5/1978 Cunnell .................. F16D 65/14
188/370
4,239,869 A * 12/1980 Annis ...................... C08G 8/00
264/328.2
(Continued)

FOREIGN PATENT DOCUMENTS

DE    10113918 A1    10/2002
EP    0745781 A2    12/1996
(Continued)

OTHER PUBLICATIONS

International Search Report dated Apr. 14, 2015, issued in counterpart International Application No. PCT/JP2015/051728 (2 pages).
(Continued)

*Primary Examiner* — Monica A Huson
*Assistant Examiner* — Kelsey C Grace
(74) *Attorney, Agent, or Firm* — Westerman, Hattori, Daniels & Adrian, LLP (57) ABSTRACT

A method for producing a molded article of the present invention includes a step of preparing a pellet raw material containing a resin and raw fibers, a step of cutting the pellet raw material to obtain a plurality of pellets each containing the resin and fibers produced by cutting the raw fibers, a step of opening the fibers contained in each pellet; and a step of
(Continued)

molding the pellets after being opened to obtain the molded article. According to the present invention, it is possible to easily produce a molded article (e.g., a back plate of a brake pad) having excellent mechanical strength. Further, According to the present invention, it is also possible to provide a molded article and a back plate each having excellent mechanical strength, and a brake pad having high reliability.

6 Claims, 1 Drawing Sheet

(51) Int. Cl.
*B29B 9/14* (2006.01)
*B29B 9/16* (2006.01)
*B29B 11/12* (2006.01)
*B29C 43/02* (2006.01)
*F16D 65/092* (2006.01)
*F16D 69/00* (2006.01)
*B29K 105/06* (2006.01)
*B29L 31/16* (2006.01)

(52) U.S. Cl.
CPC .............. *B29B 11/12* (2013.01); *B29C 43/02* (2013.01); *C08J 5/04* (2013.01); *C08J 5/042* (2013.01); *F16D 65/092* (2013.01); *F16D 69/00* (2013.01); *B29K 2105/06* (2013.01); *B29L 2031/16* (2013.01); *C08J 2363/04* (2013.01)

(56) References Cited

U.S. PATENT DOCUMENTS

| | | | |
|---|---|---|---|
| 5,268,398 A * | 12/1993 | Nakagawa | F16D 69/026 523/153 |
| 5,773,042 A | 6/1998 | Amano et al. | |
| 2001/0003321 A1 | 6/2001 | Sano | |
| 2008/0184628 A1 | 8/2008 | Sugai et al. | |
| 2010/0009158 A1 | 1/2010 | Imaizumi et al. | |
| 2010/0230040 A1* | 9/2010 | Tashiro | B29B 9/14 156/244.19 |
| 2012/0028047 A1 | 2/2012 | Imai et al. | |
| 2012/0146253 A1 | 6/2012 | Fujiura | |

FOREIGN PATENT DOCUMENTS

| | | | |
|---|---|---|---|
| EP | 1953407 A2 | 8/2008 |
| EP | 2412692 A2 | 2/2012 |
| JP | 2-303807 A | 12/1990 |
| JP | H08-85112 A | 4/1996 |
| JP | H09-48049 A | 2/1997 |
| JP | 9-76328 | 3/1997 |
| JP | 2001-165210 A | 6/2001 |
| JP | 2003-192911 A | 7/2003 |
| JP | 2007-70381 A | 3/2007 |
| JP | 2009-107147 A | 5/2009 |
| JP | 2012-096370 A | 5/2012 |

OTHER PUBLICATIONS

Extended European Search Report dated Jul. 25, 2017 issued in European Application No. 15743283.2.
Office Action dated Mar. 22, 2019, issued in counterpart EP Application No. 15743283.2 (8 pages).

\* cited by examiner

METHOD FOR PRODUCING MOLDED ARTICLE, MOLDED ARTICLE, BACK PLATE AND BRAKE PAD

TECHNICAL FIELD

The present invention relates to a method for producing a molded article, a molded article, a back plate and a brake pad.

RELATED ART

In recent years, as replacements for metal parts, molded articles produced by molding a synthetic resin mixed with fibers are attracting attention. Examples of such molded articles include a back plate to be used in a brake pad for a disc brake, and the like. The brake pad for the disc brake generally includes a lining (a friction material) for braking the disc and a back plate for supporting the lining. In order to support the lining, this back plate has to have heat resistance, brake resistance, and high mechanical strength in a high temperature atmosphere. For this reason, conventionally, ceramic plates or metal plates have been used for the back plate.

However, the ceramic plates or the metal plates have problems at the following points. Namely, their weights are heavy, it takes a long time for machining them, and their costs are high. Therefore, recently, for the purpose of weight saving and cost reduction, it is being considered that a plate produced by molding a synthetic resin mixed with fibers is used for the back plate as replacements for the ceramic plates or the metal plates.

Such a molded article (such a back plate) is generally produced by compression-molding or injection-molding pellets obtained by fixing fibers with a resin (e.g., see Patent Document 1).

However, in the molded article (the back plate) obtained by the conventional producing method, there are portions where the fibers densely exist and portions where they coarsely exist, that is, the fibers are not sufficiently and uniformly dispersed. Therefore, there is a problem in that the molded article obtained by the conventional producing method cannot have sufficient mechanical strength and strength variation occurs among the articles.

PRIOR ART DOCUMENT

Patent Document

Patent document 1: JP-A 2012-96370

SUMMARY OF THE INVENTION

Problem to be Solved by the Invention

The present invention provides a method capable of easily producing a molded article (e.g., a back plate of a brake pad) having excellent mechanical strength, and a molded article and a back plate each having excellent mechanical strength. Further, the present invention also provides a brake pad having high reliability.

Means for Solving Problem

In order to achieve the object, the present invention includes the following features (1) to (10).

(1) A method for producing a molded article, comprising:
a step of preparing a pellet raw material containing a resin and raw fibers;
a step of cutting the pellet raw material to obtain a plurality of pellets each containing the resin and fibers produced by cutting the raw fibers;
a step of opening the fibers contained in each pellet; and
a step of molding the pellets after being opened to obtain the molded article.

(2) The method for producing the molded article according to the above feature (1), wherein in the step of opening the fibers, the fibers contained in each pellet are opened, while heating the pellets at a temperature of 80 to 140° C.

(3) The method for producing the molded article according to the above feature (1) or (2), wherein an average length of the fibers contained in the pellets to be supplied to the step of opening the fibers is in the range of 3 to 100 mm.

(4) The method for producing the molded article according to the above features (1) to (3), wherein when an average length of the fibers contained in the pellets to be supplied to the step of opening the fibers is defined as "1", an average length of the fibers contained in the pellets after being opened is in the range of 0.1 to 0.8.

(5) The method for producing the molded article according to the above features (1) to (4), wherein the fibers contains at least one kind selected from the group consisting of aramid fibers, carbon fibers and glass fibers.

(6) The method for producing the molded article according to the above features (1) to (5), wherein the resin contains at least one kind selected from the group consisting of a phenol resin, an epoxy resin, a bismaleimide resin, a benzoxazine resin and an unsaturated polyester resin.

(7) The method for producing the molded article according to the above features (1) to (6), wherein the molded article is a back plate of a brake pad, the brake pad including a friction material and the back plate bonded to the friction material.

(8) A molded article produced by the method for producing the molded article according to any one of the above features (1) to (7).

(9) A back plate produced by the method for producing the molded article according to the above feature (7).

(10) A brake pad, comprising:
a friction material; and
the back plate according to the above feature (9) and bonded to the friction material.

Effects of the Invention

According to the present invention, it is possible to provide a method capable of easily producing a molded article (e.g., a back plate of a brake pad) having excellent mechanical strength.

Further, according to the present invention, it is also possible to provide a molded article and a back plate each having excellent mechanical strength.

Furthermore, according to the present invention, it is also possible to provide a brake pad having high reliability.

MODE FOR CARRYING OUT THE INVENTION

Hereinafter, description will be made on a method for producing a molded article, a molded article, a back plate of a brake pad as the molded article, and the brake pad according to the present invention in detail.

1. Method for Producing Molded Article

First, description will be made on a preferred embodiment of the method for producing the molded article according to the present invention in detail.

The method for producing the molded article of this embodiment includes: a step of preparing a pellet raw material containing a resin and raw fibers (a pellet raw material preparing step); a step of cutting the pellet raw material to obtain a plurality of pellets each containing the resin and fibers produced by cutting the raw fibers (a pellet preparing step); a step of opening the fibers contained in each pellet (an opening step); and a step of molding the pellets after being opened to obtain the molded article (a molding step).

The present invention is characterized by including the opening step. By this step, the fibers contained in each pellet are loosened, and thus the resin is spread among the fibers. Therefore, it is possible to uniformly disperse the fibers even in a finally obtained molded article. As a result, the obtained molded article exhibits excellent mechanical strength. Further, it is also possible to suppress mechanical strength variation among the obtained molded articles, thereby providing a molded article having superior quality.

Hereinafter, each step will be described.

[Pellet Raw Material Preparing Step]

First, the raw fibers are coated with the resin to prepare the pellet raw material. Here, the raw fibers mean long fibers (bundles of filaments) or rovings; (roving fibers) obtained by further bundling them.

As a method for coating the raw fibers with the resin, for example, a powder impregnation method using a roving method based on the description of JP-T 2002-509199 can be used. The powder impregnation method using the roving method is a method for coating the raw fibers by a dry process utilizing a fluidized bed technique. Specifically, first, other materials constituting the pellets than the raw fibers are directly adhered to the raw fibers from a fluidized bed without being kneaded to each other in advance. Next, the other materials are fixed to the raw fibers by being heated for a short period of time. Then, the raw fibers coated in this way are passed through a conditioning section including a heating device and an optional cooling device. In this way, an elongated pellet raw material is obtained.

[Pellet Preparing Step]

Next, the pellet raw material is cut in a predetermined length. In this way, the plurality of pellets each containing the resin and the fibers produced by cutting the raw fibers are obtained. For this cutting, for example, a strand cutter is preferably used.

Therefore, the pellets are solid products obtained by fixing bundles of the fibers with the resin. In particular, in this embodiment, since the pellets are prepared by cutting the pellet raw material, in the pellets, the bundles of the fibers are arranged in a substantially parallel along a constant direction. By preparing the pellets using such a method, it is possible to increase productivity of the pellets.

In this regard, the resin and the fibers will be described in detail later.

[Opening Step]

In this step, the fibers contained in each of the above pellets are subjected to an opening treatment. Here, the opening treatment means a treatment for flattening the bundles of the fibers by applying pressure to the bundles of the fibers (aggregates of the fibers). Examples of a method for the opening treatment include a method for passing the pellets through a narrow gap, a method for passing the pellets through a kneading unit of a uniaxial or biaxial kneader, and the like. In this regard, in the following description, the opening treatment is simply referred to as an "opening" on occasion.

By opening the fibers contained in each pellet, the fibers fixed with the resin are loosened. Further, at this time, a part (end portions) of the fibers is cut due to external stress by the opening treatment so that various fibers having different lengths become present in the pellets after being opened (hereinafter, referred to as a "fiber-containing composition" on occasion). Such fibers mainly include main-fibers and sub-fibers shorter than the main-fibers.

Here, when an average length of the fibers contained in the pellets before being opened is defined as "1", an average length of the fibers contained in the pellets after being opened is preferably in the range of 0.1 to 0.8. In this case, it is conceivable that, for example, a large number of relatively long fibers (main-fibers) having an average length of about 0.8 are present, and a small number of relatively short fibers (sub-fibers) having an average length of about 0.1 are present.

In the molded article produced using such pellets, the sub-fibers become present so as to enter gaps among the main-fibers. In other words, in the molded article, the respective fibers become present so that the gaps among the main-fibers are filled with the sub-fibers. As a result, mechanical strength and shape stability of the molded article are improved. In particular, in the case where the average length of the fibers (the main-fibers and the sub-fibers) contained in the pellets after being opened falls within the above range, the mechanical strength and the shape stability of the obtained molded article are further improved.

Specifically, the main-fibers longer than the sub-fibers mainly contribute to ensuring the mechanical strength of the molded article and to stabilizing the shape of the molded article. On the other hand, the sub-fibers also contribute to stabilizing the shape of the molded article, but mainly have a role in filling (interpolating) the gaps among the main-fibers. Namely, the sub-fibers enter the gap among the main-fibers to thereby exhibit a Junction of increasing the mechanical strength of the molded article at portions where the main-fibers are not present, that is, a function of reinforcing the effect of the main-fibers (a reinforcing function).

Further, in the case where the above-mentioned method for passing the pellets through the narrow gap is used as the method for the opening treatment, when the average length of the fibers contained in the pellets before being opened (the pellets to be supplied to the opening step) is defined as "1", the average length of the fibers contained in the pellets after being opened (the pellets having been supplied to the opening step) is more preferably in the range of 0.3 to 0.7. If the average length of the fibers after being opened falls within such a range, it is possible to more reliably exhibit the above-mentioned interaction between the main-fibers and the sub-fibers.

In contrast, if the average length of the fibers after being opened exceeds the upper limit value, the number of the main-fibers is too large, and thus there is a possibility that fluidity of a melted product or a softened product of the pellets cannot be sufficiently obtained during molding of the molded article. On the other hand, if the average length of the fibers after being opened is less than the lower limit, value, since the number of the main-fibers is too small as compared to the number of the sub-fibers, there is a fear that the inherent action of the main-fibers is not obtained depending on the constituent material of the fibers or the like, and thus the reinforcing effect of the sub-fibers is not also obtained.

Furthermore, in the case where the method for passing the above-mentioned pellets through the kneading unit of the kneader as the method for the opening treatment, when the average length of the fibers contained in the pellets before being opened is defined as "1", the average length of the fibers contained in the pellets after being opened is more preferably in the range of 0.1 to 0.6.

The average length of the fibers after being opened falls within such a range, it is possible to reliably exhibit the above-mentioned interaction between the main-fibers and the sub-fibers. In contrast, the average length of the fibers after being opened falls outside such a range, there is a possibility that the fluidity of the melted product or the softened product of the pellets cannot be sufficiently obtained as described above or a possibility that the functions of the main-fibers and the sub-fibers cannot be sufficiently exhibited.

Further, it is preferred that the opening treatment is carried out, while heating the pellets. This makes it possible to soften the resin contained in the pellets to thereby more easily and uniformly open the fibers contained in the pellets. In this regard, a temperature of the heating is preferably in the range of 80 to 140° C., and more preferably in the range of 90 to 120° C. By heating the pellets at such a temperature, it is possible to sufficiently soften the resin contained in the pellets.

As described above, the present invention is also characterized by including the opening step after the pellet preparing step. By doing so, the pellets after being opened can contain the main-fibers and the sub-fibers shorter than the main-fibers. As a result, as described above, the obtained molded article exhibit excellent mechanical strength and shape stability by the interaction between the main-fibers and the sub-fibers. Further, it is also possible to suppress the mechanical strength variation among the molded articles to thereby provide the molded article having excellent quality.

In contrast, if the opening step is carried out between the pellet raw material preparing step and the pellet preparing step, that is, if the raw fibers contained in the pellet raw material are subjected to the opening treatment, and then the pellet raw material is cut in the predetermined length to produce the pellets, the obtained pellets contain fibers each having a substantially even length. In the case where such pellets are used, it is impossible to obtain the effect by the interaction between the main-fibers and the sub-fibers like the present invention. Therefore, the molded article obtained in this way has low mechanical strength and shape stability as compared to the molded article obtained in the present invention.

[Molding Step]

In this step, the pellets obtained through the above opening step (the fiber-containing composition) are molded to thereby obtain the molded article of the present invention.

Examples of a molding method include a compression-molding method, a transfer-molding method, an injection-molding method, and the like.

According to the method for producing the molded article of the present invention as described above, the fibers contained in each pellet are loosened, and thus the resin is spreaded among the fibers. Therefore, the fibers are uniformly dispersed even in the obtained molded article. Further, since the pellets after being opened include the fibers having different lengths (the main-fibers and the sub-fibers), it is possible to obtain the molded article (the molded article of the present invention) having excellent mechanical strength and shape stability. That is, since the respective fibers are present in the molded article so that the gaps among the main-fibers are filled with the sub-fibers, the obtained molded article has particularly excellent mechanical strength and shape stability.

In this regard, before the pellets after being opened are molded in this step, the pellets after being opened may be preliminarily molded to obtain a preform. That is, the method for producing the molded article according to the present invention may include a preliminarily molding step for the pellets after being opened. This makes it possible to improve a handling property of the pellets after being opened. As a result, it is possible to increase the productivity of the molded article.

Further, before the molding step, the pellets after being opened may be subjected to a heating treatment in advance. That is, the method for producing the molded article according to the present invention may have a pre-heating step for the pellets after being opened. This makes it possible to further improve moldability (molding ease) of the pellets after being opened. As a result, it is possible to further increase the productivity of the molded article.

2. Pellets

Next, the pellets will be described in detail.

The pellets contain the resin and the fibers as described above.

Hereinafter, each component will be described in detail.

[Resin]

The pellets contain the resin.

In this regard, in this embodiment, the resin may be in any state such as a solid state, a liquid state or a semi-solid state at room temperature.

Examples of the resin include curable resins such as a thermosetting resin, a photo curable resin, a reactive curable resin and an anaerobic curable resin. Among them, in particular, the resin is preferably the thermosetting resin because it has excellent mechanical properties such as coefficient of linear expansion and elastic modulus after being cured.

Examples of the thermosetting resin include a phenol resin, an epoxy resin, a bismaleimide resin, a urea resin, a melamine resin, a polyurethane resin, a cyanate ester resin, a silicone resin, an oxetane resin, a (meth)acrylate resin, an unsaturated polyester resin, a diallyl, phthalate resin, a polyimide resin, a benzoxazine resin, and the like. One of them can be used or two or more of them can be used in combination. Among them, in particular, the thermosetting resin is preferably the phenol resin, the epoxy resin, the bismaleimide resin, the benzoxazine resin or the unsaturated polyester resin, and more preferably the phenol resin. This makes it possible for the molded article to exhibit excellent heat resistance.

Examples of the phenol resin include: a novolac type phenol resin such as a phenol novolac resin, a cresol novolac resin, a bisphenol A novolac resin or an aryl alkylene type novolac resin; a resol type phenol resin such as a unmodified resol phenol resin or an oil-modified resol phenol resin modified with oil (e.g., tung oil, linseed oil or walnut oil). One of them can be used or two or more of them can be used in combination. Among them, in particular, the phenol resin is preferably the phenol novolac resin. This makes it possible to produce the molded article at a low cost and high dimensional accuracy. Further, the obtained molded article can exhibit especially excellent heat resistance.

A weight average molecular weight of the phenol resin is not limited to a specific value, but is preferably in the range of about 1,000 to 15,000. If the weight average molecular weight is less than the above lower limit value, there is a case where the viscosity of the resin is too low, and thus the pellets become difficult to be prepared. If the weight average molecular weight exceeds the above upper limit value, there is a case where the melting viscosity of the resin becomes high, and thus the moldability (the molding ease) of the molded article is lowered. For example, the weight average molecular weight of the phenol resin can be measured by gel permeation chromatography (GPC), and then defined as a weight molecular weight in terms of polystyrene.

Examples of the epoxy resin include: a bisphenol type epoxy resin such as a bisphenol A type epoxy resin, a bisphenol F type epoxy resin or a bisphenol AD type epoxy resin; a novolac type epoxy resins such as a phenol novolac type epoxy resin or a cresol novolac type epoxy resin; a brominated epoxy resins such as a brominated bisphenol A type epoxy resin or a brominated phenol novolac type epoxy; a biphenyl type epoxy resin; a naphthalene type epoxy resin; a tris(hydroxyphenyl) methane type epoxy resin; and the like. One of them can be used or two or more of them can be used in combination. Among them, in particular, the epoxy resin is preferably a bisphenol A type epoxy resin, a phenol novolac type epoxy resin and a cresol novolac type epoxy resin each having relatively low molecular weight. This makes it possible to increase the fluidity of the melted product or the softened product of the pellets to thereby further improve the handling property and the moldability (the molding ease) thereof during producing of the molded article. Further, from the viewpoint of further improving the heat resistance of the molded article, the epoxy resin is preferably the phenol novolac type epoxy resin or the cresol novolac epoxy resin, and more preferably the tris(hydroxyphenyl) methane type epoxy resin.

The bismaleimide resin is not limited to a specific type as long as it is a resin having maleimide groups at both ends of a molecular chain thereof, and preferably further having a phenyl group. More specifically, for example, a resin represented by the following formula (1) can be used. In this regard, the bismaleimide resin may have another maleimide group bonded at a position of the molecular chain thereof other than the both ends.

[Chemical formula 1]

(1)

In the formula (1), each of $R^1$ to $R^4$ is a hydrogen atom or a substituted or unsubstituted hydrocarbon group having a carbon atom number of 1 to 4, and $R^5$ is a substituted or unsubstituted divalent organic group. Here, the organic group is a hydrocarbon group in which a heteroatom may be included, and examples of the heteroatom include O, S, N, and the like. $R^5$ is preferably a hydrocarbon group having a main chain in which a methylene group, an aromatic ring and an ether bond (—O—) are bonded together in any order, and more preferably a hydrocarbon group having a main chain in which the number of the methylene group, the aromatic ring and the ether bond, which are bonded together in any order, is 15 or less in total. In this regard, a substituent group and/or a side chain may be bonded in the middle of the main chain, and concrete examples thereof include a hydrocarbon group having a carbon atom number of 3 or less, a maleimide group, a phenyl group, and the like.

Specifically, examples of the bismaleimide resin include N,N'-(4,4'-diphenyl methane) bismaleimide, bis(3-ethyl-5-methyl-4-maleimide phenyl) methane, 2,2-bis[4-(4-maleimide phenoxy) phenyl]propane, m-phenylene bismaleimide, p-phenylene bismaleimide, 4-methyl-1,3-phenylene bismaleimide, N,N'-ethylene dimaleimide, N,N'-hexamethylene dimaleimide, and the like. One of them can be used or two or more of them can be used in combination.

An amount of the resin contained in the pellets (the molded article) is not limited to a specific value, but is preferably in the range of 20 to 80 mass %, and more preferably in the range of 30 to 50 mass %. If the amount of the resin is less than the above lower limit value, bonding strength of the resin to other materials (in particular, the fibers) constituting the pellets (the molded article) may not be sufficiently obtained depending on the kind of the resin. Further, if the amount of the resin exceeds the upper limit value, the amount of the fibers to be described later is relatively decreased, and thus an effect of containing the fibers may not be sufficiently exhibited.

[Fibers]

The pellets further contain the fibers.

An average length of the fibers contained in the pellets to be supplied to the opening step is preferably in the range of 3 to 100 mm, and more preferably in the range of 5 to 60 mm. This makes it possible to further improve the mechanical strength of the finally obtained molded article. In contrast, if the average length of the fibers is less than the above lower limit value, there is a case where the shape stability of the molded article cannot be sufficiently obtained depending on the constituent material of the fibers and the amount thereof. Further, if the average length of the fibers exceeds the upper limit value, there is a case where the fluidity of the melted product or the softened product of the pellets cannot be sufficiently obtained during molding of the molded article.

On the other hand, the pellets after being opened contain the main-fibers and the sub-fibers shorter than the main-fibers. This improves the moldability (the molding ease) of the molded article, and increases the mechanical strength and the shape stability of the obtained molded article.

An average length "L1" of the main-fibers is preferably in the range of 3 to 90 mm, more preferably in the range of 5 to 50 mm, and even more preferably in the range of 8 to 12 mm. If the average length "L1" of the main-fibers is less than the lower limit value, there is a case where the shape stability of the molded article cannot be sufficiently obtained depending on the constituent material of the main-fibers and the amount thereof. Further, if the average length "L1" of the main-fibers exceeds the upper limit value, there is a case where the fluidity of the melted product or the softened product of the pellets cannot be sufficiently obtained during molding of the molded article.

Further, an average length "L2" of the sub-fibers is preferably in the range of 0.1 to 10 mm, more preferably in the range of 0.3 to 5 mm, and even more preferably in the range of 0.5 to 3 mm. If the average length "L2" of the sub-fibers is less than the above lower limit value, there is a case where, for example, when the amount of the main-fibers is small, the amount of the sub-fibers contained in the pellets after being opened has to be relatively large in order to increase the reinforcing function by the effect of the main-fibers. Further, if the average length "L2" of the sub-fibers exceeds the upper limit value, when the amount of the main-fibers is large, the ratio of the sub-fibers entering the gap among the main-fibers is decreased.

An average diameter of the fibers (the main-fibers and the sub-fibers) is preferably in the range of 5 to 20 µm, more preferably in the range of 6 to 18 µm, and even more preferably in the range of 7 to 16 µm. If the average diameter of the fibers is less than the lower limit value, the fibers are easily broken during molding of the molded article depending on the constituent material of the fibers and the amount thereof. Further, it the average diameter of the fibers exceeds the upper limit value, there is a case where the moldability is lowered depending on the constituent material of the fibers and the amount thereof.

A cross-sectional shape of the fibers (the main-fibers and the sub-fibers) is not limited to a specific shape, and may be any shape such as a substantially circular shape (e.g., a circular shape, an elliptical shape), a polygonal shape (e.g., a triangle shape, a square shape, a hexagonal shape) or an irregular shape (e.g., a flat shape, a star shape). Among them, in particular, the cross-sectional shape of the fibers is preferably the substantially circular shape or the flat shape. This makes it possible to improve smoothness of a surface of the molded article. Further, this also makes it possible to further improve the handling property of the melted product or the softened product of the pellets during molding of the molded article to thereby increase the moldability thereof.

Examples of the fibers (the main-fibers and the sub-fibers) include: organic fibers such as aramid fibers, acryl fibers, nylon fibers (aliphatic polyamide fibers) and phenol fibers; inorganic fibers such as glass fibers, carbon fibers, ceramic fibers, rock wool, potassium titanate fibers and basalt fibers; metal fibers such as stainless steel fibers, steel fibers, aluminum fibers, copper fibers, brass fibers and bronze fibers; and the like. One of them can be used or two or more of them can be used in combination. Among them, in particular, the fibers preferably contain at least one kind selected from the aramide fibers, the carbon fibers and the glass fibers.

In the case where the glass fibers are used, uniformity per unit volume of the melted product or the softened product of the pellets is improved, and thus the moldability of the melted product or the softened product of the pellets becomes particularly good. Further, by improving the uniformity per unit volume of the melted product or the softened product of the pellets, uniformity of internal stress in the obtained molded article is also improved, and thus waviness of the molded article becomes small. Furthermore, it is also possible to further improve wear resistance of the molded article at high load. On the other hand, in the case where the carbon fibers or the aramid fibers are used, it is possible to further enhance the mechanical strength of the molded article, and to make the molded article more lightweight.

Concrete examples of glass constituting the glass fibers include E glass, C glass, A glass, S glass, D glass, NE glass, T glass, and H glass. Among them, in particular, the glass constituting the glass fibers is preferably the E glass, the T glass, or the S glass. By using such glass fibers, it is possible for the fibers (the main-fibers and the sub-fibers) to have high elasticity and low coefficient of thermal expansion.

Further, concrete examples of the carbon fibers include high strength carbon fibers having tensile strength of 3500 MPa or more, high elastic modulus carbon fibers having elastic modulus of 230 GPa or more, and the like. The carbon fibers may be either polyacrylonitrile (PAN)-based carbon fibers or pitch-based carbon fibers, but are preferably the polyacrylonitrile-based carbon fibers because they have high tensile strength.

Further, an aramid resin constituting the aramid fibers may have either a meta-type structure or a para-type structure.

Further, it is preferred that the fibers are subjected to a surface treatment in advance.

By subjecting the fibers to the surface treatment in advance, it is possible to improve dispersibility of the fibers in the fiber-containing composition, and to increase adhesion thereof to the resin.

Examples of a method for such a surface treatment include a coupling agent treatment, an oxidation treatment, an ozone treatment, a plasma treatment, a corona treatment, and a blast treatment. One of them can be used or two or more of them can be used in combination. Among them, in particular, the method for the surface treatment is preferably the coupling agent treatment.

A coupling agent used in the coupling agent treatment is not limited to a specific type, and can be appropriately selected depending on the kind of the resin.

Examples of the coupling agent include a silane-based coupling agent, a titanium-based coupling agent, and an aluminum-based coupling agent. One of them can be used or two or more of them can be used in combination. Among them, in particular, the coupling agent is preferably the silane-based coupling agent. This especially improves the adhesion of the fibers to the resin (the curable resin).

Examples of the silane-based coupling agent include an epoxy silane coupling agent, a cationic silane coupling agent, an amino silane coupling agent, a vinyl silane coupling agent, a mercapto silane coupling agent, a methacryl silane coupling agent, a chloro silane coupling agent, an acryl silane coupling agent, and the like.

An amount of the fibers contained in the pellets (the fiber-containing composition) is preferably in the range of 20 to 80 mass %, and more preferably in the range of 30 to 70 mass %. This makes it possible to more efficiently improve the mechanical strength of the obtained molded article.

[Other Components]

The pellets may further contain a curing agent, a curing assistant, a filler, a mold release agent, a pigment, a sensitizer, an acid-increasing agent, a plasticizer, a flame retardant, a stabilizer, an antioxidant, an antistatic agent, and the like, if necessary.

The curing agent can be appropriately selected and used depending on the kind of the resin or the like, but is not limited to a specific compound.

In the case where, for example, the phenol resin is used as the resin, the curing agent is used by selecting from an epoxy compound having two or more functional groups, isocyanates, hexamethylene teramine, and the like.

Further, in the case where the epoxy resin is used as the resin, the curing agent is used by selecting from an amine compound such as an aliphatic polyamine, an aromatic polyamine or dicyaminediamide, an acid anhydride such as an alicyclic acid anhydride or an aromatic acid anhydride, a polyphenol compound such as a novolac type phenol resin, an imidazole compound and the like. Among them, from the viewpoint of handling workability and environment, the novolac type phenol resin is preferably selected as the curing agent.

In particular, in the case where the phenol novolac type epoxy resin, the cresol novolac type epoxy resin or the tris(hydroxyphenyl) methane type epoxy resin is used as the epoxy resin, the novolac type phenol resin is preferably selected and used as the curing agent. This makes it possible to improve the heat resistance of the molded article.

In the case where the curing agent is used, an amount of the curing agent contained in the pellets (the fiber-containing composition) is suitably set depending on the kind of the curing agent or the resin to be used or the like, but is, for example, preferably in the range of 0.1 to 30 mass %. This makes it possible to easily mold the molded article into any shape.

Further, the curing assistant is not limited to a specific type. As the curing assistant, for example, an imidazole compound, a tertiary amine compound, art organic phosphorus compound or the like can be used.

In the case where the curing assistant is used, an amount of the curing assistant contained in the pellets (the fiber-containing composition) is suitably set depending on the kind of the curing assistant or the curing agent to be used or the like, but is preferably, for example, in the range of 0.001 to 10 mass %. This makes it possible to more easily cure the pellets (the fiber-containing composition) to thereby more rapidly mold the molded article.

Further, examples of the filler include, but are not limited to, an inorganic filler, an organic filler, and the like. Examples of the inorganic filler include calcium carbonate, clay, silica, mica, talc, wollastonite, glass beads, milled carbon, graphite, and the like. One of them can be used or two or more of them can be used in combination. Further, examples of the organic filler include polyvinyl butyral, acrylonitrile butadiene rubber, pulp, wood flour, and the like. One of them can be used or two or more of them can be used in combination. Among them, in particular, from the viewpoint of further enhancing an effect of improving toughness of the molded article, the acrylonitrile butadiene rubber is preferably used as the filler (the organic filler).

In the case where the filler is used, an amount of the filler contained in the pellets is not limited to a specific value, but is preferably in the range of 1 to 30 mass %. This makes it possible to further improve the mechanical strength of the molded article.

Further, the mold release agent is not limited to a specific type. As the mold release agent, zinc stearate, calcium stearate or the like can be used.

In the case where the mold release agent is used, an amount of the mold release agent contained in the pellets is not limited to a specific value, but is preferably in the range of 0.01 to 5.0 mass %. This makes it possible to easily mold the molded article in any shape.

3. Molded Article

Examples of the molded article of the present invention include a compression-molded article, an injection-molded article, an extrusion-molded article, and the like, and it can be used for various parts each requiring high mechanical strength and shape stability. Examples of the part (the molded article) include an interior part or an exterior part of a car, a back plate of a brake pad, a casing of an electrical product, an exterior part or the like of furniture, and the like. Since, in particular, the back plate constituting the brake pad for the disc brake requires extremely high mechanical strength and shape stability, the molded article of the present invention is preferably used for it. The brake pad of the present invention provided with such a back plate has high reliability.

Figure 1:
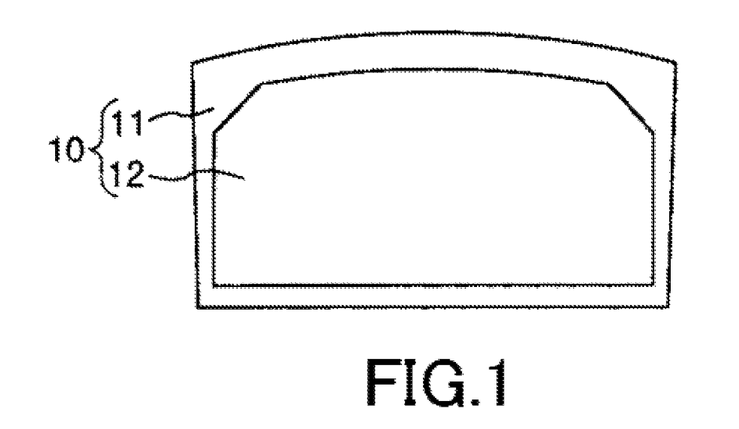
FIG. 1 is a plan view showing an embodiment of a brake pad of the present invention.
Figure 2:
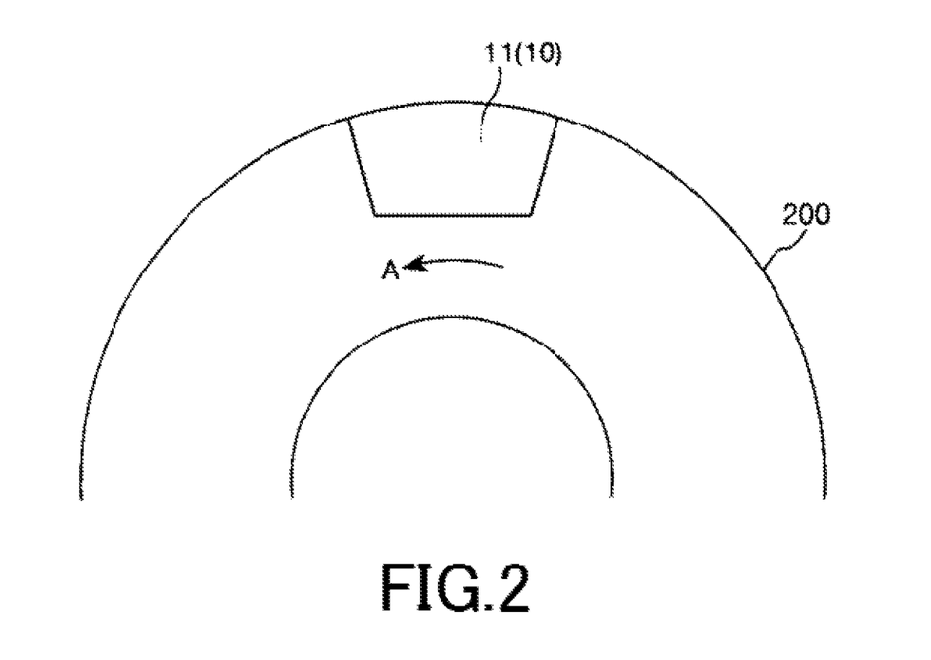
FIG. 2 is a view showing a state in which the brake pad of the present invention is arranged to a disk.

Here, an example of the brake pad of the present invention will be described. FIG. 1 is a plan view showing an embodiment of the brake pad of the present invention, FIG. 2 is a view showing a state in which the brake pad of the present invention is arranged to a disk.

The brake pad 10 is pressed against the disc during braking, and can control rotation of the disk 200 by a frictional force which would be generated with the disk 200.

The brake pad 10 is formed from a bonded body obtained by bonding a back plate 11 and a friction member 12 together. In the brake pad 10, the back plate 11 and the friction member 12 may be adhered or fused (welded) to each other, or the back plate 11 and the friction member 12 may be integrated with each other.

Further, in this embodiment, a planar shape of the brake pad 10 (the friction material 12 and the back plate 11) is a substantially square shape as shown in FIG. 1. Then, the friction material 12 has a size smaller than the back plate 11 in a plan view thereof, and is positioned so as to be included within the back plate 11 in the plan view thereof.

In this regard, in this embodiment, the planar shape of each of the friction member 12 and the back plate 11 is a substantially rectangular shape, but is not limited thereto. The planar shape of each of the friction member 12 and the back plate 11 may be, for example, a substantially circular shape, a polygonal shape, or the like. Further, these planar shapes may be, respectively, different shapes. In this regard, these planar shapes may be appropriately set according to the intended use of the brake pad 10.

Hereinafter, description will be sequentially made on the friction member 12 and the back plate 11 constituting the brake pad 10.

[Friction Material]

The friction material makes contact with the disc during braking, and functions to suppress the rotation of the disk by the friction which would be generated due to the contact.

The friction member 12 makes contact with the disc 200 during braking, and thus generates frictional heat by the friction which would be generated with the disc 200. Therefore, it is preferred that a constituent material of the friction material 12 has excellent heat resistance so as to resist the friction heat during braking. Concrete examples of the constituent material thereof include, but are not limited to, a mixture containing: a fibrous material such as rock wool, Kevlar fibers or copper fibers; a binder such as a resin; and a filler such as barium sulfate, zirconium silicate, cashew dust or graphite.

Further, an average thickness of the friction material 12 is not limited to a specific value, but is preferably in the range of 3 to 15 mm, and more preferably in the range of 5 to 12 mm. If the average thickness of the friction material 12 is less than the above lower limit value, there is a case where mechanical strength of the friction member 12 is lowered depending on a material constituting it or the like. This causes easy breakage of the friction member 12 and makes a life thereof short. Further, if the average thickness of the friction material 12 exceeds the upper limit value, there is a case where the whole caliper device provided with the friction member 12 becomes slightly large.

[Back Plate]

The back plate 11 (the back plate of the present invention) is produced by the above-mentioned method for producing the molded article, and it is hard and has high mechanical strength and excellent shape stability. Therefore, the back plate 11 is hardly deformed and thus can reliably support the friction member, and can also uniformly transmit a pressing force of a piston to the friction material during braking.

In this regard, in the back plate 11, for example, the main-fibers and the sub-fibers, respectively, may be oriented along a thickness direction of the back plate 11, may be oriented along a planar direction of the back plate 11, may be oriented to be inclined at a predetermined angle with respect to the thickness direction or the planar direction of the back plate 11, may be oriented at a low orientation degree, or may not be completely oriented (may be in a non-orientation state).

However, in the case where at least the main-fibers of the main-fibers and the sub-fibers are orientated along the planar direction of the back plate 11, it is possible to further reduce dimensional change of the back plate 11 along the planar direction thereof. As a result, it is possible to more reliably suppress or prevent deformation such as warpage of the back plate 11. In this regard, the orientation of the main-fibers and the sub-fibers along the planar direction of the back plate 11 means a state that the main fibers or the sub-fibers are oriented so as to be substantially parallel to a surface of the back plate 11.

Further, in the case where the main-fibers and the sub-fibers are oriented at the low orientation degree or are in the non-orientation state, it is possible to reduce anisotropy of the back plate 11 in physical properties such as intensity distribution, molding shrinkage and linear expansion. This makes it possible to further improve the mechanical strength and the shape stability of the back plate 11. Such a back plate 11 can be easily obtained by compression-molding the pellets after being opened. Further, according to the compression-molding, it is possible to easily mold a back plate 11 having a thick thickness, and to more stably maintain the lengths of the fibers even in the back plate 11. Furthermore, in the case where the back plate 11 is produced by the compression-molding, it is also possible to reduce a loss of the pellets during molding.

In this regard, example of a method for producing the brake pad 10 include, but are not limited to, a method in which the back plate 11 is molded, and then bonded to the frictional members 12, a method in which the back plate 11 and the friction member 12 are integrally molded, and the like.

Hereinabove, the descriptions have been made on the preferred embodiments of the present invention, but the present invention is not limited thereto.

EXAMPLES

Hereinbelow, more detailed description will be made on the present invention with reference to Examples and Comparative Examples, but the present invention is not limited thereto.

<1> Production of Molded Article

Example 1

[1] Preparation of Pellets

Pellets were prepared as follows.

First, 55.0 mass % of glass fibers ("Glass fiber roving 1084" produced by PPG, average diameter: 15 μm) subjected to a surface treatment with a silane coupling agent were prepared as raw fibers of fibers.

Next, 36.0 mass % of a phenol resin ("SUMILITE RESIN PR-51470" produced by Sumitomo Bakelite Co., Ltd., weight average molecular weight: 2800) as a resin, 6.0 mass % of hexamethylene tetramine as a curing agent, 1.0 mass % of magnesium oxide as a curing assistant, 1.0 mass % of calcium stearate as a mold release agent, and 1.0 mass % of carbon black as a pigment were mixed with each other to thereby obtain a resin mixture.

Next, the glass fibers subjected to the surface treatment were coated with the obtained resin mixture utilizing a fluidized bed technique. The resin mixture was melted and fixed by a heater heated at 400° C., and then cooled.

Next, the glass fibers coated with the resin mixture were cut using a strand cutter so that fibers having an average length of 20 mm were obtained. In this way, pellets were obtained.

[2] Opening Step

The obtained pellets were subjected to an opening treatment using a uniaxial kneader (product name "IMC-1894 Model" produced by Imoto Machinery Co., Ltd.), while being heated at 100 to 110° C. to thereby obtain the pellets after being opened (the fiber-containing composition).

[3] Production of Molded Article

A molded article was produced using the obtained pellets after being opened (the fiber-containing composition) as follows.

First, the pellets after being opened (the fiber-containing composition) were put into a mold heated at 80 to 90° C., and then compressed by a conventional method to prepare a preform. A length of the preform was 75 mm, a width thereof was 45 mm, a height thereof was 8 mm, and a weight thereof was 30 g.

Next, the preform was preheated at 100 to 110° C. using a parallel-plate type high frequency preheater. The preheated preform was put into a mold, and then cured by being pressed and heated to obtain a molded article having a length of 80 mm×a width of 50 mm×a thickness of 4 mm. Molding conditions were a mold temperature of 170 to 1810° C., a molding pressure of 20 to 30 MPa, and a curing time of 3 minutes.

Examples 2 to 13

A molded article was produced in the same manner as in Example 1 except that components of the pellets were changed as shown in Table 1.

Comparative Example 1

A molded article was produced in the same manner as in Example 1 except that the opening step [2] of Example 1 was not carried out, and the pellets were used as the "fiber-containing composition" of the production of molded article [3].

In Table, the fibers obtained from the glass fibers ("Glass fiber roving 1084" produced by PPG, average diameter D1: 15 μm) were shown as "Glass 1", fibers obtained from carbon fibers ("Carbon fiber roving HTS40" produced by Toho Tenax Co., Ltd., average diameter D1: 7 μm) were shown as "Carbon 1", the magnesium oxide as the curing assistant was shown as "Z1", clay as a filler was shown as "J1", milled carbon as a filler was shown as "J2", and graphite as a filler was shown as "J3".

TABLE 1

| | Pellets | | | | | | | | | | | | |
|---|---|---|---|---|---|---|---|---|---|---|---|---|---|
| | Fibers | | | Resin material Phenol | Curing agent | Curing assistant | | Filler | | Mold release agent | Pigment | Molded article |
| | Silane coupling agent | Amount [mass %] | Kind | Average Length [mm] | resin Amount [mass %] | Amount [mass %] | Kind | Amount [mass %] | Kind | Amount [mass %] | Amount [mass %] | Amount [mass %] | Bending strength |
| Ex. 1 | Treated | 55.0 | Glass 1 | 20 | 36.0 | 6.0 | Z1 | 1.0 | — | 0.0 | 1.0 | 1.0 | A |
| Ex. 2 | Treated | 55.0 | Glass 1 | 6 | 36.0 | 6.0 | Z1 | 1.0 | — | 0.0 | 1.0 | 1.0 | D |
| Ex. 3 | Treated | 55.0 | Glass 1 | 55 | 36.0 | 6.0 | Z1 | 1.0 | — | 0.0 | 1.0 | 1.0 | B |
| Ex. 4 | Treated | 73.0 | Glass 1 | 20 | 19.0 | 5.0 | Z1 | 1.0 | — | 0.0 | 1.0 | 1.0 | C |
| Ex. 5 | Treated | 22.0 | Glass 1 | 20 | 47.0 | 5.0 | Z1 | 0.5 | J1 | 23.5 | 1.0 | 1.0 | D |
| Ex. 6 | Treated | 45.0 | Glass 1 | 20 | 36.0 | 6.0 | Z1 | 1.0 | J2 + J3 | 10.5 | 1.0 | 0.5 | B |
| Ex. 7 | Treated | 50.0 | Glass 1 | 20 | 36.0 | 6.0 | Z1 | 1.0 | J1 | 5.0 | 1.0 | 1.0 | B |
| Ex. 8 | Treated | 55.0 | Carbon 1 | 20 | 36.0 | 6.0 | Z1 | 1.0 | — | 0.0 | 1.0 | 1.0 | B |
| Ex. 9 | Treated | 55.0 | Glass 1 | 50 | 36.0 | 6.0 | Z1 | 1.0 | — | 0.0 | 1.0 | 1.0 | B |
| Ex. 10 | Treated | 55.0 | Glass 1 | 3 | 36.0 | 6.0 | Z1 | 1.0 | — | 0.0 | 1.0 | 1.0 | D |
| Ex. 11 | Treated | 55.0 | Carbon 1 | 10 | 36.0 | 6.0 | Z1 | 1.0 | J1 | 1.5 | 0.0 | 0.5 | B |
| Ex. 12 | Treated | 55.0 | Glass 1 | 10 | 36.0 | 6.0 | Z1 | 1.0 | — | 0.0 | 1.0 | 1.0 | C |
| Ex. 13 | Treated | 55.0 | Glass 1 | 15 | 36.0 | 6.0 | Z1 | 1.0 | — | 0.0 | 1.0 | 1.0 | B |
| Comp. Ex. 1 | Treated | 55.0 | Glass 1 | 20 | 36.0 | 6.0 | Z1 | 1.0 | — | 0.0 | 1.0 | 1.0 | E |

<2> Evaluation of Molded Article (Bending Strength)

From a center portion of the molded article of each of Examples and Comparative Example, a part having a size of length 80 mm×width 10 mm×thickness 4 mm was cut, and used as a test piece for measuring bending strength. The bending strength of the test peace was measured based on ISO 178, and then evaluated according to the following criteria.

A: Bending strength is 140 Mpa or more.
B: Bending strength is 120 Mpa or more, but less than 140 Mpa.
C: Bending strength is 100 Mpa or more, but less than 120 Mpa.
D: Bending strength is 80 Mpa or more, but less than 100 Mpa.
E: Bending strength is less than 80 Mpa.

This result was shown in Table 1 together.

As apparent from Table 1, the molded article of each of Examples according to the present invention had good moldability. Further, it had excellent bending strength. In contrast, in Comparative Example, satisfactory results were not obtained.

INDUSTRIAL APPLICABILITY

A method for producing a molded article of the present invention includes a step of preparing a pellet raw material containing a resin and raw fibers, a step of cutting the pellet raw material to obtain a plurality of pellets each containing the resin and fibers produced by cutting the raw fibers, a step of opening the fibers contained in each pellet; and a step of molding the pellets after being opened to obtain the molded article. According to the present invention, it is possible to easily produce a molded article (e.g., a back plate of a brake pad) having excellent mechanical strength. Further, According to the present invention, it is also possible to provide a molded article and a back plate each having excellent mechanical strength. Furthermore, according to the present invention, it is also possible to provide a brake pad having high reliability. Therefore, the present invention has industrial applicability.

What is claimed is:

1. A method for producing a molded article, comprising:
   a step of coating raw fibers with a resin to obtain a pellet raw material containing the resin and the raw fibers;
   a step of cutting the pellet raw material such that the raw fibers are cut in a predetermined length to obtain a plurality of pellets each containing the resin and a bundle of fibers produced by cutting the raw fibers;
   a step of applying pressure to the pellets such that the bundle of fibers contained in each pellet are flattened and a part of the fibers is cut due to external stress by applying pressure to produce main-fibers and sub-fibers shorter than the main fibers; and
   a step of putting the pellets after being flattened into a mold to obtain the molded article.

2. The method for producing the molded article as claimed in claim 1, wherein in the step of applying pressure to the pellets, the bundle of fibers contained in each pellet are flattened, while heating the pellets at a temperature of 80 to 140° C.

3. The method for producing the molded article as claimed in claim 1, wherein an average length of the bundle of fibers contained in the pellets to be supplied to the step of applying pressure to the pellets is in the range of 3 to 100 mm.

4. The method for producing the molded article as claimed in claim 1, wherein the fibers contains at least one selected from the group consisting of aramid fibers, carbon fibers and glass fibers.

5. The method for producing the molded article as claimed in claim 1, wherein the resin contains at least one selected from the group consisting of a phenol resin, an epoxy resin, a bismaleimide resin, a benzoxazine resin and an unsaturated polyester resin.

6. The method for producing the molded article as claimed in claim 1, wherein the molded article is a back plate of a brake pad.

* * * * *